United States Patent Office 3,449,304
Patented June 10, 1969

3,449,304
**POLYMERS OF HEXAFLUOROCYCLOPENTADI-
ENE AND PERFLUORODICYCLOPENTADIENE**
John Ferguson Harris, Jr., Wilmington, Del., assignor to
E. I. du Pont de Nemours and Company, Wilmington
Del., a corporation of Delaware
No Drawing. Continuation-in-part of applications Ser. No.
284,844, June 3, 1963, and Ser. No. 413,636, Nov. 24,
1964. This application Oct. 19, 1965, Ser. No. 498,126
Int. Cl. C08d 3/14; C08f 3/00, 31/00
U.S. Cl. 260—80.76                       17 Claims

ABSTRACT OF THE DISCLOSURE

Polymers of hexafluorocyclopentadiene or perfluorodicyclopentadiene including their copolymers with other ethylenically unsaturated monomers such as tetrafluoroethylene, methyl methacrylate, acrylonitrile, hexafluoropropene, vinylidene fluoride, perfluoromethyl perfluorovinyl ether and the like. The polymers may range from liquids to solids and are capable of being crosslinked.

---

This application is a continuation-in-part of my copending applications Ser. No. 284,844, filed June 3, 1963 and Ser. No. 413,636, filed Nov. 24, 1964.

This invention relates to polymers of perfluorinated cyclic dienes, namely hexafluorocyclopentadiene (also called perfluorocyclopentadiene) and perfluorodicyclopentadiene (also called the dimer of perfluorocyclopentadiene). These dienes may be represented by the following structural formulae:

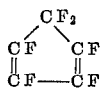  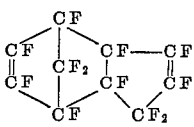

hexafluorocyclopentadiene    perfluorodicyclopentadiene

In the context of this invention the word "polymers" is not intended to refer to compounds such as dimers but to higher molecular weight materials, e.g., those having at least five recurring monomeric units.

Preparation of hexafluorocyclopentadiene monomer

The following method of preparation can be used:

A. 1,2-dihydrooctafluorocyclopentane

A glass tube, 25 mm. in diameter by 50 cm. long, fitted with a thermocouple well and containing 36 g. of 0.5% palladium on 8–14 mesh alumina, is connected at one end to a round-bottomed reservoir fitted with a gas inlet tube reaching almost to the bottom and at the other end to an ice-cooled receiver which is vented through a trap cooled to −78° C. The system is purged thoroughly with nitrogen, and the reservoir is then cooled to −78° C. and charged with 300–450 g. of octafluorocyclopentene. The reservoir of octafluorocyclopentene is allowed to warm slowly, and as it warms a stream of hydrogen through the gas inlet carries vapors of octafluorocyclopentene into the column of palladium catalyst. The ensuing reduction reaction in the column is strongly exothermic, and the temperature of the catalyst is allowed to reach the range of 175–200° C., where it is held by alternate cooling and warming of the reservoir of octafluorocyclopentene. About 2–3 hours are required to transport all of the starting material from the reservoir into and through the catalytic reduction column. The total reaction mixture that is collected in the ice-cooled receiver and in the −78° C. trap is separated at room temperature in a separatory funnel, and a small amount of water contaminant is thus removed. Fractional distillation of the non-aqueous phase yields a small forerun, B.P. 25–76° C., which is largely octafluorocyclopentene, and a major amount of principal product, B.P. 76–80° C. Gas chromatographic analysis of the large fraction indicates it to be a mixture of two components in a ratio of about 3:1. A sample of the predominant component is isolated by gas chromatography and identified as 1,2-dihydrooctafluorocyclopentane by n-m-r spectroscopy and elemental analysis.

Analysis for $C_5H_2F_8$: Calc'd: C, 28.0; H, 0.9; F, 71.0. Found: C, 28.3; H, 1.1; F, 71.6.

The lesser product, B.P. 80° C., also separated by gas chromatography, is identified by its n-m-r spectrum as 1,1,2-trihydroheptafluorocyclopentane.

B. Hexafluorocyclopentadiene

Since the mixture of dihydro- and trihydrocyclopentanes prepared in Part A cannot be separated readily by distillation, the mixture itself is used in the preparation of hexafluorocyclopentadiene. A round-bottom flask equipped with a stirrer, a dropping funnel and a reflux condenser is charged with 454 g. of potassium hydroxide (minimum 85%). Hot water is circulated through the reflux condenser vented through a trap cooled to −78° C. and the flask is immersed in an oil bath heated to 155–160° C. in order to liquefy the potassium hydroxide. There is then added over a period of 1.5 hours, with stirring, 100 g. of the mixture of 1,2-dihydrooctafluorocyclopentane/1,1,2-trihydroheptafluorocyclopentane from Part A. The product that is collected in the trap at −78° C. weighs 45.5 g. It is found by means of gas chromatography to contain hexafluorocyclopentadiene, 1-hydroheptafluorocyclopentene and 3-hydroheptafluorocyclopentene in proportions which indicate yields of 20%, 27% and 12.5%, respectively, based on the 1,2-dihydrooctafluorocyclopentane in the starting material. Pure samples of these three products are isolated by gas chromatography, and that of hexafluorocyclopentadiene is found to boil at 28° C.

Analysis for $C_5F_6$: Calc'd: C, 34.5; F, 65.5. Found: C, 33.8; F, 64.9.

The fluorine n-m-r pattern, infrared spectrum and ultraviolet spectrum are consistent with the assigned hexafluorocyclopentadiene structural formula.

Preparation of perfluorodicyclopentadiene monomer

The compound perfluorodicyclopentadiene is a semisolid at room temperature having a normal boiling point of 119° to 120° C., molecular weight of 348, a density at 45° C. of 1.75, refractive index $n_D{}^{45}$=1.3387, and a melting point of about 43° C. This compound can be prepared as follows: To a one-liter flask equipped with a Vigreux column topped by a take-off arm and condenser are added 100 gm. of acid-washed zinc dust, 0.2 gm. of fused zinc chloride suspended in 200 ml. of sodium-dried dioxane. After the mixture is heated to reflux, 230 gm. (0.77 mole) of trichloroheptafluorocyclopentane in 100 ml. of sodium-dried dioxane is gradually added with rapid stirring. The contents are refluxed for 24 hours before fractional distillation in a 30-inch spinning band column. A fraction recovered at 30° C. is hexafluorocyclopentadiene ($C_5F_6$) which is dimerized at room temperature to form the perfluorodicyclopentadiene product.

Polymers of hexafluorocyclopentadiene

The monomer hexafluorocyclopentadiene has been disclosed heretofore but only by name. Polymers of this compound have not been disclosed previously even by name. In accordance with the present invention, there are provided homopolymers of hexafluorocyclopentadiene and copolymers with one or more other ethylenically unsaturated (i.e., vinyl-type) monomers.

All of these polymers contain in linear formation recurring units of hexafluorocyclopentenylene groups —$C_5F_6$— believed to have the formula (1) 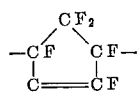

and the formula (2) 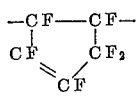

Groups of Formula 1 are generally in major proportion. The homopolymers contain a plurality, generally at least 5, of recurring units (1) and (2). The copolymers include copolymers with one or more other ethylenically unsaturated compounds that undergo vinyl-type polymerization. These copolymers preferably contain at least one mole-percent of the recurring units (1) and (2) shown above.

The present polymers are prepared by polymerization of hexafluorocyclopentadiene alone or together with one or more other ethylenically unsaturated monomers copolymerizable therewith by means of conventional vinyl polymerization procedures using free radical initiators (cf., Schildknecht, "Polymer Processes," High Polymers, vol. X, Interscience Publishers, 1956). These methods include procedures involving no solvent or diluent (bulk polymerization), a solvent medium (solution polymerization) or a non-solvent medium or diluent (e.g., aqueous dispersion polymerization).

Representative vinyl monomers copolymerizable with hexafluorocyclopentadiene in this invention are as follows: ethylene, propylene, isobutylene, styrene, vinyl chloride, vinyl fluoride, vinylidene chloride, vinylidene fluoride, trifluoroethylene, tetrafluoroethylene, chlorotrifluoroethylene, hexafluoropropene, acrylonitrile, methacrylonitrile, methyl acrylate, methyl methacrylate, acrylic acid, methacrylic acid, methyl vinyl ether, isobutyl vinyl ether, vinyl acetate, vinyl stearate, vinyl benzoate, butadiene, isoprene, 2,3-dimethyl-1,3-butadiene, 1,5-hexadiene, cyclopentadiene, and the like.

When 1,3-dienes such as hexafluorocyclopentadiene are polymerized with free radical initiators, the bulk of the polymerization reaction is believed to occur by 1,4-addition and the resultant recurring units to have the Formula 1 previously shown. At the same time a minor amount of monomer is believed to enter into the polymerization reaction by 1,2-addition, and the recurring units formed in this fashion to have the Formula 2 previously shown. Some comonomers, such as styrene and vinyl acetate, have a tendency to react with hexafluorocyclopentadiene in the Diels-Alder manner as well as in the vinyl polymerization manner. Accordingly, products of both reaction systems may be expected. Since Diels-Alder reactions do not require free radical initiators, however, the Diels-Alder adducts would be the sole products in the absence of initiators.

During the polymerization of hexafluorocyclopentadiene, a dimerization reaction of the latter to perfluorodicyclopentadiene competes with the polymerization of hexafluorocyclopentadiene. For this reason, in polymerizing hexafluorocyclopentadiene one probably obtains units of dimer in the resulting polymer, the amount tending to increase at higher polymerization temperatures. Therefore, when hexafluorocyclopentadiene is polymerized the 5.7µ IR band noted in the resulting products may indicate the presence of hexafluorocyclopentadiene units, perfluorodicyclopentadiene units or both.

The hexafluorocyclopentadiene polymers of this invention are film and fiber-forming solids. The solid polymers have a variety of specific properties which are dependent upon composition with respect to kind and number of comonomers and the proportions thereof in the polymer, e.g., they may be hard and stiff or relatively soft and elastomeric. All of the polymers are characterized by the presence of a double bond in the hexafluorocyclopentadiene-derived recurring units. This double bond is detected by infrared spectroscopy, absorption in the 5.7µ (1755 cm.$^{-1}$) region being indicative of a fluorocarbon double bond. Presence of this unsaturation permits curing or cross-linking of the polymers by conventional methods such as heating (press-curing) or vulcanization. The solid polymers of hexafluorocyclopentadiene are useful as plastics, e.g., in the preparation of molded articles and pressed films. Since the polymers can be thermally crosslinked (cured), they are useful in thermosetting adhesives, elastomers or hard moldings.

Polymers of perfluorodicyclopentadiene

Polymers of perfluorodicyclopetadiene include higher molecular weight materials (e.g., those having at least five recurring units) such as homopolymers and copolymers with one or more other ethylenically unsaturated monomers copolymerizable therewith. Representative vinyl monomers include: ethylene, propylene, isobutylene, styrene, vinyl chloride, vinyl fluoride, vinylidene chloride, vinylidene fluoride, trifluoroethylene, chlorotrifluoroethylene, hexafluoropropene, acrylonitrile, methacrylonitrile, methyl acrylate, methyl methacrylate, acrylic acid, methacrylic acid, methyl vinyl ether, isobutyl vinyl ether, vinyl acetate, vinyl stearate, vinyl benzoate, butadiene, isoprene, 2,3-dimethyl-1,3-butadiene, 1,5-hexadiene, cyclopentadiene, perfluoromethyl perfluorovinyl ether, and the like.

Homopolymerization or copolymerization is conducted using conventional vinyl polymerization procedures, e.g., using free radical initiators (cf., Schildknecht, "Polymer Processes," High Polymers, vol. X, Interscience Publishers, 1956). Various polymerization methods include procedures involving no solvent or diluent, i.e., bulk polymerization, a suitable solvent medium, i.e., solution polymerization, and a non-solvent medium or diluent, i.e., suspension or dispersion polymerization.

The perfluorodicyclopentadiene polymers of this invention may have a wide range of molecular weights. The solid polymers may have a variety of specific properties which are dependent upon composition with respect to kind and numbers of comonomers and the proportions thereof in the polymer, e.g., they may be hard and stiff or relatively soft and elastomeric. The presence of perfluorodicyclopentadiene monomer units in the polymer provides a number of unreacted carbon-to-carbon double bonds. These can act as cure sites for the conversion of the polymers to cross-linked materials by conventional methods, e.g., heating or vulcanization with suitable cross-linking agents. The solid polymers may be useful in the preparation of plastic or elastomeric molded articles, pressed films and the like.

This description of the invention is continued with reference to specific examples thereof; parts and percentages are by weight unless otherwise indicated.

EXAMPLE 1

Polymeric hexafluorocyclopentadiene

A mixture of 0.8 ml. (ca. 1.23 g.) of hexafluorocyclopentadiene and 6 mg. of $N_2F_2$ (cf., U.S. 2,963,468) was sealed in an evacuated platinum tube cooled in liquid nitrogen. The tube was heated at 60° C. for 4 hours while under 3000 atmospheres pressure of nitrogen in a steel pressure vessel. The tube was cut open and the solid contents were removed and subjected to oil pump vacuum to remove any volatile material. There remained 0.26 g. (21%) of white polymeric product. An infrared spectrum of this material exhibited a strong band at 5.68µ (i.e., 1760 cm.$^{-1}$) indicative of a fluorocarbon double bond. The polymer was pressed to clear colorless self-supporting films at 240° C. and 18,500 lb. ram pressure.

EXAMPLE 2

Hexafluorocyclopentadiene/tetrafluoroethylene copolymer

A mixture of 0.67 g. of tetrafluoroethylene, 1.15 g. of hexafluorocyclopentadiene, 1 ml. of perfluoro(dimethylcyclobutane), and 6 mg. of $N_2F_2$ was sealed in a platinum tube carried through the procedure described in Example 1. There was obtained 0.72 g. of white polymeric solid which showed a band indicative of fluorocarbon unsaturation at $5.68\mu$ (1760 cm.$^{-1}$) in the infrared spectrum. The product was identified as a copolymer containing about 29 mole percent (ca. 42% by weight) of hexafluorocyclopentadiene.

Analysis for 29/71 $C_5F_6/C_2F_4$: Calc'd: C, 28.4; F, 71.6. Found: C, 27.5; F, 71.6.

A sample was pressed to a clear colorless self-supporting film at 240° C. and 18,000 lb. ram pressure.

EXAMPLE 3

Hexafluorocyclopentadiene/methyl methacrylate copolymer

A mixture of 1.1 ml. of hexafluorocyclopentadiene, 1 ml. of methyl methacrylate and 0.05 g. of $\alpha,\alpha'$-azobis(isobutyronitrile) was sealed under vacuum in a small heavy-walled glass tube and heated at 79–80° C. for 15.25 hours. The viscous liquid reaction mixture was held under vacuum with an oil pump and heated to remove volatile components. The residual solid polymer was then removed from the tube by dissolving it in acetone. After evaporation of the acetone, 0.54 g. of polymer was obtained in the form of a solid film. The product was identified as a copolymer containing about 28 mole percent (ca. 40% by weight) of hexafluorocyclopentadiene.

Analysis for 28/72 $C_5F_6/C_5H_8O_2$: Calc'd: F, 26.4. Found: F, 26.6.

EXAMPLE 4

Hexafluorocyclopentadiene/acrylonitrile copolymer

A mixture of 1 ml. of acrylonitrile, 1 ml. of hexafluorocyclopentadiene and 0.005 g. of $\alpha,\alpha'$-azobis(isobutyronitrile) was sealed under vacuum in a small heavy-walled glass tube and heated at 80° C. for 1.5 hours. The tube was opened and the contents were heated under oil pump vacuum to remove volatile components. There remained 0.4 g. of a solid polymeric product which was identified as a copolymer containing about 7 mole percent (ca. 19% by weight) of hexafluorocyclopentadiene.

Analysis for 7/93 $C_5F_6/C_3H_3N$: Calc'd: F, 13.0. Found: F, 12.4

EXAMPLE 5

Hexafluorocyclopentadiene-hexafluoropropene/vinylidene fluoride copolymer

A 400 ml. pressure reactor was purged with nitrogen and charged with 20 ml. of deoxygenated, distilled water, 0.55 g. of ammonium persulfate $[(NH_4)_2S_2O_8]$, 0.15 g. of ammonium perfluorooctanoate and 3.0 g. of disodium phosphate $(Na_2HPO_4 \cdot 7H_2O)$. The reactor was cooled to −78° C., evacuated and charged with 2.7 g. of hexafluorocyclopentadiene, 15.3 g. of hexafluoropropene and 26.3 g. of vinylidene fluoride. The mixture was agitated and heated successively at 80° C. for 1 hour and at 100° C. for 1.5 hours under autogenous pressure, which reached a maximum of 500 lb./sq. in. The reaction mixture was cooled to room temperature, removed from the reactor, and mixed with an equal volume of 0.5% aqueous potassium alum solution. The coagulated polymeric product was separated on a filter, washed with water and dried overnight at 60° C. in a vacuum oven. There was obtained 22.4 g. of light brown polymer which was shown to contain hexafluorocyclopentadiene units by the presence of an infrared absorption band at $5.69\mu$, indicative of a fluorocarbon double bond. Copolymers of hexafluoropropylene/vinylidene fluoride prepared in the above manner in the absence of hexafluorocyclopentadiene do not show infrared absorption at $5.69\mu$. By elemental analysis, the polymer corresponds to a terpolymer containing about 88% vinylidene fluoride, 10% hexafluoropropene and 2% hexafluorocyclopentadiene on a molar basis (ca. 75%, 20% and 5%, respectively, by weight).

Analysis for 88/10/2 $C_2H_2F_2/C_3F_6/C_5F_6$: Calc'd: H, 2.4; C, 34.6; F, 63.0. Found: H, 2.4, 2.3; C, 34.2, 33.9; F, 61.3, 61.3

Samples of the above-described terpolymer were cured by heating in a press at 150° C for 1.5 and 17 hours, respectively. The cured samples were insoluble in methyl isobutyl ketone, whereas an uncured sample was completely soluble. A sample of hexafluoropropene/vinylidene fluoride copolymer (i.e., containing no hexafluorocyclopentadiene units) that had been heated at 150° C. for 17 hours in a press was also completely soluble in methyl isobutyl ketone. The press-cured terpolymer samples possessed relatively good elastomeric properties, as shown in the following comparative tabulation of tensile strength and elongation data:

|  | Tensile strength at break (lbs.) | Elongation at break (percent) |
| --- | --- | --- |
| Sample cured 1.5 hours | 2,300 | 340 |
| Sample cured 17 hours at 150° C | 1,200 | 260 |
| Fully-cured, vulcanized hexafluoropropene/vinylidene fluoride copolymer | 2,650 | 180 |

EXAMPLE 6

Perfluorodicyclopentadiene homopolymer

A liquefied 0.5 ml. sample of perfluorodicyclopentadiene was charged into a small "Teflon" (polytetrafluoroethylene resin) container and then pressured in a Bridgeman apparatus to 25,000 atmospheres. The sample was heated to about 290° C. over a period of about 14 hours; at about 50° C. a volume change occurred suddenly. The sample was then shaken with 1.5 ml. of pentane to dissolve the excess unpolymerized material. The residue was a white solid, pentane-insoluble polymer of perfluorodicyclopentadiene.

EXAMPLE 7

Perfluorodicyclopentadiene/tetrafluoroethylene/perfluoromethyl perfluorovinyl ether copolymer To copolymerize tetrafluoroethylene (TFE), perfluoromethyl perfluorovinyl ether ($P_fMVE$), and perfluorodicyclopentadiene ($P_fDCPD$) proceed as follows:

A glass reactor of 275 cc. capacity, equipped with a magnetically driven agitator, was charged first with 0.5 gms. of perfluorodicyclopentadiene and then with the following aqueous solution, both operations being performed under a blanket of argon:

| | |
| --- | --- |
| Distilled deoxygenated water _____ml__ | 125 |
| 0.01% aqueous copper sulfate solution _____ml__ | 1.25 |
| Potassium persulfate _____gm__ | 1.0 |
| Sodium bisulfite _____gm__ | 0.25 |
| Commercial ammonium perfluorooctanoate ("FC-126") _____gm__ | 0.41 |
| $Na_2HPO_4 \cdot 7H_2O$ _____gm__ | 3.0 |

The reactor was immersed in a "Dry Ice"-acetone bath and the contents frozen. The reactor was then evacuated and 15 grams of perfluoromethyl perfluorovinyl ether, previously charged into a small pressure cylinder, were introduced into the reactor. In the same manner, 6.2 gms. of tetrafluoroethylene were introduced. The bath was removed and replaced by a water bath maintained at 55–65° C. As the contents slowly melted the pressure within the reactor rose to approximately 180 p.s.i.g. Stirring was initiated as soon as the aqueous solution melted. The stirring was continued until the internal pressure became constant, around 90 p.s.i.g. Agitation was stopped, and the reactor was cooled to room temperature, followed by venting to atmospheric pressure. The latex product was discharged from the reactor and the polymer isolated by coagulation with the saturated aqueous solution of aluminum potassium sulfate, $AlK(SO_4)_2 \cdot 12H_2O$. It was then washed with water several times in a blender, and dried in a 70° C. vacuum oven to yield 10.7 gms. of a white, solid polymer.

The infrared spectrum of the terpolymer thus prepared showed a distinct absorption band at 1760 cm.$^{-1}$, indicative of the presence of a perfluorinated double bond. This absorption band is prominent in the spectrum of perfluorodicyclopentadiene itself and since no hexafluorocyclopentadiene is present, it is believed to indicate units of $P_f$DCPD in the polymer.

A control dipolymer containing only TFE and $P_f$MVE units was prepared using the above-described procedure, except that the perfluorodicyclopentadiene was omitted. This control copolymer does not show infrared absorption at 1760 cm.$^{-1}$ When a mixture of 1 gm. of perfluorodicyclopentadiene and 9 gm. of a TFE/$P_f$MVE dipolymer (similar to the control dipolymer) were dissolved in commercial dichloro-octafluorobutane and subjected to the isolation conditions described above, an infrared spectrum of this isolated mixture did not show any absorption at 1760 cm.$^{-1}$, but only in the regions identical to the control polymer.

Another solid TFE/$P_f$MVE/$P_f$DCPD terpolymer was prepared under the conditions, described above except that 1.0 gm. of perfluorodicyclopentadiene was used instead of 0.5 gm. A much stronger absorption at 1760 cm.$^{-1}$ appeared as well as new, weak absorptions at 1390 cm.$^{-1}$, 995 cm.$^{-1}$, 935 cm.$^{-1}$, 830 cm.$^{-1}$, all of which were present in perfluorodicyclopentadiene but not in the control polymer.

The two terpolymers and the control polymer were readily soluble in commercial dichloro-octafluorobutane ("Halocarbon 428") at room temperature. After heating in a sheet mold under pressure for 1 hr. at 165° C. only the control polymer was completely soluble; this illustrates the thermal curability of those terpolymers having $P_f$DCPD units.

An alternative procedure to prepare a TFE/$P_f$MVE/$P_f$DCPD terpolymer is as follows:

Under a nitrogen blanket, charge a 1 gal. autoclave, which is equipped with an agitator and means for heating and cooling, with an aqueous solution consisting of:

| | |
|---|---|
| Water ml__ | 1554 |
| 4% aqueous solution of $Na_3PO_4$ ml__ | 173 |
| 4% aqueous solution of $Na_2HPO_4$ ml__ | 173 |
| Ammonium persulfate gms__ | 8 |
| Perfluorooctanoic acid gms__ | 5 |

Introduce gaseous TFE and $P_f$MVE in the mole ratio of 40/60 and allow the pressure to build up to 230 p.s.i.g. During this operation, raise the temperature of the charge to 50° C. and introduce 50 grams of $P_f$DCPD.

When the pressure reaches 230 p.s.i.g. change the mole ratio of TFE to $P_f$MVE in the gaseous feed from 40/60 to 60/40 and continue the introduction of the gases at such a rate that a pressure of 230 p.s.i.g. is maintained for 6 hours.

During this 6-hour period, add at 30-minute intervals 10 ml. of a solution made up of

| | |
|---|---|
| Water ml__ | 720 |
| Aqueous solution of copper sulfate containing the equivalent of 0.01% copper ion by weight ml__ | 180 |
| $NA_2SO_2$ gms__ | 18 |

After 6 hours, vent the autoclave to atmospheric pressure, discharge the latex product and isolate the copolymer as described above.

EXAMPLE 8

Perfluorodicyclopentadiene/hexafluoropropene/vinylidene fluoride copolymer

To copolymerize vinylidene fluoride ($VF_2$), hexafluoropropylene (HFP) and perfluorodicyclopentadiene ($P_f$DCPD) proceed as follows:

A one-liter stainless steel autoclave, equipped with an agitator and means for heating and cooling, was charged, under a nitrogen blanket, with 4.5 gm. of melted perfluorodicyclopentadiene. An aqueous solution of the following was introduced:

| | |
|---|---|
| Distilled deoxygenated water ml__ | 400 |
| 1% aqueous silver nitrate solution ml__ | 21 |
| $NA_2HPO_4 \cdot 7H_2O$ gm__ | 1.8 |
| $Na_3PO_4 \cdot 12H_2O$ gm__ | 1.8 |
| Commercial ammonium perfluorooctanoate ("FC-126") gm__ | 0.64 |
| Ammonium persulfate gm__ | 0.35 |

The autoclave was flushed several times with hexafluoropropene by pressuring and venting to atmospheric pressure. It was sealed and 85 gm. of hexafluoropropene was added. The temperature was raised to 50° C. and gaseous vinylidene fluoride was added while agitating until the pressure reached 350 p.s.i.g. The pressure was maintained by adding $VF_2$ as required until 32 gm. was absorbed over a 2.25-hour period. Agitation was stopped, and the autoclave was cooled to room temperature, followered by venting to atmospheric pressure. The latex product was discharged from the autoclave and the polymer isolated by freezing the latex until it coagulated. It was then washed with water several times in a blender and dried in a 70° C. vacuum oven overnight to yield about 50 gms. of polymer.

A control dipolymer containing only hexafluoropropene and vinylidene fluoride was prepared using the above procedure (without $P_f$DCPD) wherein the monomers were charged in a ratio of 85 gm. to 32 gm., respectively. This control dipolymer was used as a comparison in the evaluation of properties of the terpolymer.

The infrared spectrum of the polymer containing perfluorodicyclopentadiene showed a weak but distinct absorption band at 1755 cm.$^{-1}$, attributable to perfluorinated double bonds. The band persisted after dissolving the polymer in acetone, filtering, evaporating the solvent and re-testing. The control dipolymer did not shown infrared absorption at 1755 cm.$^{-1}$.

The polymer containing perfluorodicyclopentadiene had an inherent viscosity at 30° C. of 1.685 and the control dipolymer had an inherent viscosity of 1.935, when measured at a 0.1% concentration in a mixture of tetrahydrofuran and dimethylformamide wherein the weight percentages are 86.85 and 13.15, respectively.

Both the polymer containing perfluorodicyclopentadiene and the control dipolymer were readily soluble in acetone at room temperature.

Samples of the polymer containing perfluorodicyclopentadiene and of the control polymer were sheeted out on a cool rubber mill and molded into test slabs by heating under pressure for 30 minutes at 150° C. The slabs were removed from the mold, cooled to room temperature and tested with the following results:

| | $VF_2$/HFP/ $P_f$DCPD terpolymer | $VF_2$/HFP control dipolymer |
|---|---|---|
| Modulus at 300% elongation (p.s.i.) | 1,160 | 300 |
| Tensile strength (p.s.i.) | 2,325 | 550 |
| Elongation at break (percent) | 450 | 450 |
| Permanent set at break (percent) | 45 | 40 |
| Appearance after immersion in acetone for 24 hours at room temperature | Swollen | Dissolved |

This illustrates that the presence of $P_f$DCPD units in the polymer permits thermal curing with attendant increases in modulus, strength and solvent resistance, whereas a thermally-treated control polymer without such units displays lower values in each of these properties.

An alternative procedure to prepare a $VF_2$/HFP/ $P_f$DCPD terpolymer is as follows:

Under a nitrogen blanket, charge a 1.4 liter stainless-steel autoclave, which is equipped with an agitator and means for heating and cooling, with an aqueous solution consisting of:

| | |
|---|---|
| Water _____ ml__ | 572 |
| 1% aqueous silver nitrate solution _____ ml__ | 30 |
| $Na_2HPO_4 \cdot 7H_2O$ _____ gms__ | 2.25 |
| $Na_3PO_4 \cdot 12H_2O$ _____ gms__ | 2.25 |
| Perfluorooctanoic acid _____ gm__ | 0.90 |
| Ammonium persulfate _____ gm__ | 0.50 |

Purge the autoclave of nitrogen by pressuring with HFP to 25 p.s.i.g. and venting to atmosperic pressure five times in succession. Cool the charge to about 20° C. and introduce 120 gms. HFP and 40 gms. $P_fDCPD$.

Raise the temperature of the charge to 50° C. and, while agitating, add gaseous $VF_2$ until the pressure is 300 p.s.i.g. Maintain this pressure by adding $VF_2$ as required until 50 gms. have been introduced.

Vent the autoclave to atmospheric pressure and discharge the latex product. Isolate the copolymer from the latex by any convenient coagulation procedure, such as by freezing, salting out or evaporation followed by washing to remove inorganic materials.

To copolymerize tetrafluoroethylene (TFE) and $P_fDCPD$ use the alternative procedure described immediately above for the copolymerization of $VF_2$, HFP and $P_fDCPD$ with the following changes:

(a) replace the mixture of HFP and $P_fDCPD$ with 100 grams of $P_fDCPD$ and
(b) replace $VF_2$ with TFE and maintain a pressure of 115 p.s.i.g. instead of 300 p.s.i.g.
(c) omit the HFP purging operation.

An alternative procedure is to prepare a 1:1 mole ratio mixture of TFE and $P_fDCPD$ with 1 to 5 mole percent of nitrogen difluoride in a solvent such as hexafluoropropylene cyclic dimer and pressure this mixture at 3000 atm. pressure while heating at about 60° C. for several hours.

As many widely different embodiments of this invention may be made without departing from the spirit and scope thereof, it is to be understood that this invention is not limited to the specific embodiments thereof except as defined in the appended claims, and all changes which comes within the meaning and range of equivalence are intended to be embraced therein.

What is claimed is:

1. A solid cross-linkable homopolymer of hexafluorocyclopentadiene containing in linear formation at least five recurring hexafluorocyclopentenylene units, said units independently selected from the group consisting of (1) 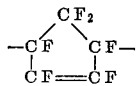

and (2) 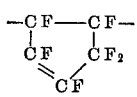

2. A solid, cross-linkable copolymer of hexafluorocyclopentadiene and at least one other polymerizable ethylenically unsaturated monomer copolymerizable therewith, the said copolymer containing at least one mole percent of hexafluorocyclopentenylene units independently selected from the group consisting of (1) 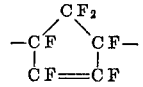

and (2) 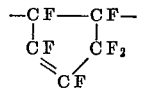

3. A dipolymer according to claim 2 wherein said other monomer is tetrafluoroethylene.
4. A dipolymer according to claim 2 wherein said other monomer is methyl methacrylate.
5. A dipolymer according to claim 2 wherein said other monomer is acrylonitrile.
6. A terpolymer according to claim 2 wherein the other monomers are hexafluoropropene and vinylidene fluoride.
7. The cross-linked polymer resulting from cross-linking the homopolymer of claim 1.
8. The cross-linked polymer resulting from cross-linking the copolymer of claim 2.
9. A self-supporting film formed from the homopolymer of claim 1.
10. A self-supporting film formed from the copolymer of claim 2.
11. A solid homopolymer of perfluorodicyclopentadiene containing at least five recurring perfluorodicyclopentadiene monomer units, the said units providing unreacted carbon-to-carbon double bonds to render the polymer cross-linkable.
12. A solid copolymer of perfluorodicyclopentadiene and at least one other polymerizable ethylenically unsaturated monomer copolymerizable therewith, the said copolymer containing at least five recurring monomeric units, the perfluorodicyclopentadiene monomer units in the polymer providing unreacted carbon-to-carbon double bonds to render the copolymer cross-linkable.
13. A terpolymer according to claim 12 wherein the other monomers are hexafluoropropylene and vinylidene fluoride.
14. A dipolymer according to claim 12 wherein the said other monomer is tetrafluoroethylene.
15. A copolymer according to claim 12 wherein the other monomers are tetrafluoroethylene and perfluoromethyl perfluorovinyl ether.
16. The cross-linked polymer resulting from cross-linking the homopolymer of claim 11.
17. The cross-linked polymer resulting from cross-linking the copolymer of claim 12.

References Cited

UNITED STATES PATENTS 2,929,851   3/1960   Luvisi _____ 260—650

JOSEPH L. SCHOFER, *Primary Examiner.*

STANFORD M. LEVIN, *Assistant Examiner.*

U.S. Cl. X.R.

260—80.77, 82.1, 85.5, 85.7, 86.3, 87.5, 87.7, 91.5, 648